(12) United States Patent
Birkhold et al.

(10) Patent No.: US 12,527,533 B2
(45) Date of Patent: Jan. 20, 2026

(54) COMPUTER-IMPLEMENTED METHOD FOR OPERATING AN X-ray FACILITY, X-ray FACILITY, COMPUTER PROGRAM, AND ELECTRONICALLY READABLE DATA CARRIER

(71) Applicant: Siemens Healthcare GmbH, Erlangen (DE)

(72) Inventors: Annette Birkhold, Stuttgart (DE); Philipp Roser, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 302 days.

(21) Appl. No.: 18/476,609

(22) Filed: Sep. 28, 2023

(65) Prior Publication Data

US 2024/0099674 A1  Mar. 28, 2024

(30) Foreign Application Priority Data

Sep. 28, 2022 (DE) ...................... 10 2022 210 292.4

(51) Int. Cl.
*G16H 10/60* (2018.01)
*A61B 6/00* (2006.01)
(Continued)

(52) U.S. Cl.
CPC .......... *A61B 6/4014* (2013.01); *A61B 6/0407* (2013.01); *A61B 6/06* (2013.01);
(Continued)

(58) Field of Classification Search
CPC ....... A61B 6/4014; A61B 6/0407; A61B 6/06; A61B 6/4441; G16H 10/60; G16H 30/40;
(Continued)

(56) References Cited

U.S. PATENT DOCUMENTS

2007/0242865 A1  10/2007 Fenchel
2007/0258639 A1  11/2007 Pfister
(Continued)

FOREIGN PATENT DOCUMENTS

DE 102006017932 A1  10/2007
DE 102006021372 A1  11/2007
(Continued)

*Primary Examiner* — David P Porta
*Assistant Examiner* — Fani Polyzos Boosalis
(74) *Attorney, Agent, or Firm* — Lempia Summerfield Katz LLC (57) ABSTRACT

A method for operating an X-ray facility for recording a three-dimensional (3D) image data set of a target area of a patient is provided. A recording arrangement including an X-ray detector and an X-ray source may be rotated about an axis of rotation for recording two-dimensional projection images based on the image data set. A model instance of a parameterizable patient model that is patient-specific and 3D is determined. Target area information describing the target area is determined in the model instance from default information. At least two at least partially different partial recording areas of the target area are determined from the target area information. The partial recording areas cover the target area along the axis of rotation. One projection image set is recorded for each of the partial recording areas, and the image data set is reconstructed from the projection image sets.

17 Claims, 4 Drawing Sheets

(51) Int. Cl.
    *A61B 6/04*    (2006.01)
    *A61B 6/06*    (2006.01)
    *A61B 6/40*    (2024.01)
    *G06T 11/00*   (2006.01)
    *G06T 19/00*   (2011.01)
    *G06T 19/20*   (2011.01)
    *G16H 30/40*   (2018.01)

(52) U.S. Cl.
    CPC .......... *A61B 6/4441* (2013.01); *G06T 11/006* (2013.01); *G06T 19/003* (2013.01); *G06T 19/20* (2013.01); *G16H 10/60* (2018.01); *G16H 30/40* (2018.01); *G06T 2210/41* (2013.01); *G06T 2211/444* (2023.08); *G06T 2219/2004* (2013.01)

(58) Field of Classification Search
    CPC ..... G06T 11/006; G06T 19/003; G06T 19/20; G06T 2211/444; G06T 2210/41; G06T 2219/2004
    See application file for complete search history.

(56) References Cited

U.S. PATENT DOCUMENTS

| | | |
|---|---|---|
| 2011/0274246 A1 | 11/2011 | Maschke |
| 2015/0228071 A1* | 8/2015 | Jockel .................. G06T 7/0012 |
| | | 382/132 |
| 2017/0053562 A1* | 2/2017 | Bova ...................... G09B 23/28 |
| 2017/0311921 A1 | 11/2017 | Feuerlein |
| 2017/0340299 A1 | 11/2017 | Grass |

FOREIGN PATENT DOCUMENTS

| | | |
|---|---|---|
| DE | 102010019990 A1 | 11/2011 |
| DE | 102011080607 A1 | 2/2013 |
| DE | 102012215496 A1 | 3/2014 |
| DE | 102016207367 A1 | 11/2017 |

\* cited by examiner

COMPUTER-IMPLEMENTED METHOD FOR OPERATING AN X-ray FACILITY, X-ray FACILITY, COMPUTER PROGRAM, AND ELECTRONICALLY READABLE DATA CARRIER This application claims the benefit of German Patent Application No. DE 10 2022 210 292.4, filed on Sep. 28, 2022, which is hereby incorporated by reference in its entirety.

BACKGROUND

The present embodiments relate to operating an X-ray facility for recording a three-dimensional image data set of a target area of a patient.

In the context of medical interventions (e.g., minimally invasive interventions), but also for other medical procedures (e.g., examinations), a number of applications may also obtain three-dimensional information from inside the patient. Since a dedicated computed tomography facility may not be available and makes access to the patient more difficult during the procedure, X-ray facilities with a movable recording arrangement, which may be provided, for example, on a C-arm, are usually used. The recording arrangement is rotated around the patient (e.g., by the C-arm) in order to record projection images from different projection directions, a circular path, or at least essentially a circular path usually being used as the recording trajectory. A three-dimensional image data set may be reconstructed from the projection images using known, conventional methods (e.g., filtered back projection).

Such recording technologies (e.g., those that employ an X-ray facility with a C-arm) may use cone-beam geometry, so that the recording technology is also referred to as cone beam computed tomography (CBCT).

Particularly with regard to minimally invasive interventions in which a medical instrument (e.g., a catheter) is to be navigated through the body of the patient (e.g., the vascular system), it cannot always be provided that a desired, target area of the patient to be recorded is completely contained in the detection area of the recording arrangement. Similar problems occur with the imaging of larger organs (e.g., the liver). Such applications may be summarized under the collective term "long objects" and relate to cases in which the target area is larger than the detection area of the recording arrangement along the axis of rotation of the recording arrangement. In this context, it was initially proposed to record two separate image data sets (e.g., CBCT images) and to analyze the two separate image data sets separately, although difficulties may arise due to the lack of provision of a connection between the two image data sets. It was also proposed to simultaneously record two partial image data sets (e.g., CBCT images reconstructed from separate projection image sets) and to merge the two partial image data sets into a single volume (e.g., a single image data set). In this case, for example, a biplane X-ray facility that includes two (e.g., jointly movable) recording arrangements may be used. Another solution proposed in the prior art is to record a pre-image data set of the target area using a computed tomography facility before the medical procedure (e.g., before the medical, minimally invasive, intervention, on which, two-dimensional fluoroscopy images from the X-ray facility may then be superimposed).

In general (e.g., in the case of long objects), there is a problem with the isocentering of recording areas on X-ray facilities (e.g., X-ray facilities that are interventional and/or have a C-arm) being time-consuming and complicated. Usually, anterior-posterior and lateral projection images are required in order to provide the correct relative positioning of the patient and the X-ray facility. This is made even more difficult if both recording arrangements of a biplane X-ray facility for recording are to be used for partial recording areas (e.g., for simultaneous imaging of the aortic arch and the brain).

Due to overlapping partial recording areas for long objects, the projection images of both recording arrangements also overlap. This prevents the simultaneous isocentering of the partial recording areas as far as the same projection direction (e.g., anterior-posterior or lateral) is concerned, as the X-ray detectors would collide. On the other hand, non-simultaneous isocentering leads to additional problems as the optimal position of a patient couch, on which the patient is to be placed, is difficult to determine based on orthogonal views of the two recording arrangements.

For example, with regard to the navigation applications mentioned above, there is also a great desire for dose reduction, so that collimation is to be used. However, the arrangement of the collimator based on two-dimensional projections is also highly error-prone.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an option for improving selection of partial recording areas for long objects and with regard to isocentering is provided.

A computer-implemented method has the following acts according to the present embodiments. A patient-specific, three-dimensional model instance of a parameterizable patient model is determined. The model instance describes a surface and at least one internal organ of the patient. Target area information describing the target area in the model instance is determined from default information provided. At least two at least partially different partial recording areas of the target area are determined from the target area information. The partial recording areas cover the target area along the axis of rotation. One projection image set is recorded, respectively, for each of the partial recording areas, and the image data set is reconstructed from the projection image sets.

A model instance representing a digital twin of the current patient is derived from a patient model (e.g., statistically formed) that thus describes the patient sufficiently accurately to serve as a basis for determining partial recording areas of the target area. For this purpose, input parameters describing at least the current patient are transferred to the patient model in order to adapt the patient model for forming the model instance to the current patient. In this way, personalized access to patient-specific three-dimensional target area X-ray imaging of long objects is thus provided, which uses a digital twin of the patient in the form of the model instance. From corresponding default information, the target area in the model instance and thus target area information may be determined. The default information directly or indirectly describes the target area to be recorded and may be provided by user input or automatically retrieved from another information source related to the current process (e.g., a patient file, an information system, and/or a registration). Suitable partial recording areas may be derived automatically from the target area information that may be used for automatic isocentering provided that appropriate consideration is given to the position of the patient relative to the X-ray facility (e.g., to the recording arrangement). This provides that, for example, controlled by a control facility of the X-ray facility, at least one recording arrangement may be moved into the correct position for recording the partial recording area, and the recording of projection images for each of the partial recording areas may take place.

In other words, using a personalized patient model, an optimal setting of the X-ray facility described by the partial recording areas (e.g., the position of the patient couch and the recording arrangement) may be derived without the time-consuming and complex recording of additional two-dimensional X-ray images for isocentering, so that the recording process may be significantly accelerated. In the case of a medical intervention (e.g., a minimally invasive intervention), this also applies to intervention planning (e.g., navigation planning). Optimized partial recording areas and thus optimized coverage of the target area are provided, so that anatomical navigation and other evaluation may be improved. The likelihood of errors or other disadvantageous effects is reduced. In summary, an excellent assistance function for medical personnel is provided, with the workflow for medical procedures involving the use of CBCT (e.g., for minimally invasive interventions) being significantly simplified, accelerated, and more robust.

In one embodiment, the patient model may be statistically determined from a multiplicity of patient information of different people, which includes at least the surface, at least one organ, and the parameters necessary to generate a model instance. The patient model may therefore be a statistical form model that relates both to the surface and to the at least one organ. It is possible to create the patient model using full-body computed tomography images as patient information, for example. The result is a statistical, three-dimensional form (and pose) model for the surface and at least one organ as a patient model for a given population of people. For example, more than one organ is taken into account, so that it is also possible to speak of a multi-organ model. Patient models may also take into account implants and other apparatuses located in the body, but these may also be used in some other way, as will be explained in more detail hereinafter. A three-dimensional statistical patient model may be used.

In embodiments, the statistical patient model may also include a trained artificial intelligence function (e.g., a neural network). It is possible for the trained function, for example, to be trained based on patient information to output a model instance of the patient model when the corresponding input parameters are entered.

Patient data of the patient (e.g., age and/or gender and/or height and/or weight) may be used as parameters for generating the model instance (e.g., input parameters of the patient model). It may be appropriate, and in many cases sufficient, to use the height, weight, and gender of the patient as patient data. It is possible to achieve further refinement of the model instance with regard to the patient if the age of the patient (e.g., in the case of geriatric and/or pediatric patients) is also used. The patient data or, in general, the parameters may be determined automatically from information available in any case (e.g., from patient registration, an electronic patient file, a radiology information system (RIS), and/or a hospital information system (HIS) and/or input at least partially by an operator). Despite less metadata (e.g., only the weight, height, and gender), already excellent consistency with actual patient model instances may be derived as a digital twin from, for example, statistical patient models.

However, it may also be provided with particular advantage that the model instance is adapted to the patient based on at least one item of additional information (e.g., image information and/or sensor information) about the patient. This provides that additional information (e.g., available in any case) may be used to adapt the model instance even better to the current patient. Image information may include X-ray images and/or previously recorded images (e.g., pre-image data sets) of the patient already taken with the X-ray facility as part of the current medical procedure. For example, an information system and/or an electronic patient file may already contain relevant recordings from the past that show portions of the patient and may be used to adjust the model instance at least locally. Sensor information may, for example, describe the surface of the patient. For example, sensors (e.g., radar sensors or imaging sensors) may be provided as part of the X-ray facility or assigned to the X-ray facility in order to be able to determine the position of the patient by measuring their surface. For example, terahertz cameras or other 3D cameras may be used. It is possible for terahertz cameras and also radar sensors to penetrate substances arranged on the patient. The corresponding sensor data, pre-evaluated if necessary, provides further information about the body surface and may also be used advantageously to adapt the model instance. Additional information that goes beyond the scope of these examples and/or additional information contained in image information and/or sensor information may also relate to implants and/or apparatuses in the patient that may be included in the model instance.

In general, the target area information as well as the partial recording areas may be determined in the coordinate system of the X-ray facility, which is also used for positioning the patient couch and the recording arrangement. In other words, embodiments may provide that, in addition to the model instance, an X-ray facility model of the X-ray facility (e.g., as a digital twin of the X-ray facility) is also used. In one embodiment, the model instance and the X-ray facility model may be positioned relative to one another.

In one embodiment, in order to position the model instance in a coordinate system of the X-ray facility (e.g., an X-ray facility model), at least one item of positioning information describing the positioning of the patient in the X-ray facility is received and evaluated. For this purpose, it may be provided, for example, that the positioning information is determined from sensor data of a sensor directed at the patient and/or from a user input. Suitable sensors (e.g., radar sensors and/or optical sensors, such as terahertz cameras) have already been mentioned with regard to the additional information and have already been proposed in the prior art, so that their sensor data may also be used here to determine the positioning information. However, the positioning information may also be determined at least partially from a user input. Positioning information may also be known at least partially in a control facility of the X-ray facility (e.g., as far as system settings are concerned, such as with regard to a patient couch). The positioning information may include an orientation of the patient and/or a position indication for positioning the patient on a patient couch of the X-ray facility and/or a setting of the patient couch. For example, if there is no sensor technology or if the sensor technology does not provide sufficiently accurate sensor data, user input may be made, for example, for the orientation of the patient (e.g., supine/prone, head first/feet first) and/or for the position on the patient couch (e.g., a distance from an end-side edge). It is also possible to use different predefined positions to position the patient accordingly and then to select the predefined position.

According to the present embodiments, the target area information may be determined as default information from a user input and/or from application information describing the imaging target (e.g., an image recording protocol to be used). In a specific embodiment, it is possible, for example, to represent the model instance on a display facility (e.g., a touchscreen). It is possible to define the target area by defining a cuboid or any other three-dimensional shape in the model instance (or another representation of the patient). The target area information includes at least one item of organ information describing an organ to be recorded of the at least one organ. This provides that, for example, organs that are to be included in the target area may also be defined by a user. The target area may be inferred from the organs accordingly. User input is not necessarily required if the desired target area is already described, possibly indirectly, based on information available in the control facility of the X-ray facility or information that may be retrieved through the control facility. Such application information may result, for example, from an information system and/or an electronic patient file (e.g., as a type of planned medical intervention). Thus, for example, from the application information that a medical instrument (e.g., a catheter) is to be introduced into the head of the patient through the vascular system, it may be inferred that imaging of the brain and the aortic arch is required. For a liver examination, it may be clear that the liver is to be recorded. Such application information may also result from a selected imaging protocol that may, for example, be tailored to certain organs and/or areas of the body or, if necessary, even be named after them.

In one embodiment, the target area information includes at least one item of organ information describing an organ of at least one organ to be recorded, which is evaluated together with the location of at least one organ in the model instance when determining the partial recording areas. Since the position and extent of the organs to be recorded results from the model instance, an extremely precise definition of the partial recording areas may be achieved such that only what is really necessary is recorded. For example, a dose load on the patient may be reduced in this way. In one embodiment, as will be discussed in more detail below, collimation may also be automatically determined and used, which may relate to the possibility of representing such specific organs.

In one embodiment, the partial recording areas may be determined in an optimization process (e.g., for minimizing a number of partial recording areas and/or for minimizing a patient dose). Based on the target area information and the model instance of the patient model in the coordinate system of the X-ray facility (e.g., in the context of the X-ray facility model), an optimal set of image recording areas of minimal size may be determined in order to reduce the dose but cover the defined target area. In this case, embodiments are also conceivable that do not necessarily minimize the number of partial recording areas, but rather, use collimations in order nevertheless to achieve a lower patient dose in the case of more partial recording areas. This, however, is a rather specific application. For example, in the context of a biplane X-ray facility, a restriction to two partial recording areas that may then also be recorded simultaneously may be provided. During the optimization process, it is also possible to use constraints (e.g., a predefined setpoint edge around organs to be recorded and the like).

In an embodiment, it may be provided that a collimation parameter describing a collimation to be applied is determined for each partial recording area (e.g., taking into account an organ to be recorded described by the target area information) and is applied in the respective recording of the projection image set. In this case, the collimation parameter may refer to various modifiable properties of a collimation facility of the X-ray facility. For example, the collimation parameter may be a geometric parameter describing the geometry of the collimation (e.g., a shape and/or at least one extension and/or at least one direction of the collimation). Further, the collimation parameter may also relate to an aperture configuration and the like. For example, collimation may be carried out such that the target organ to be recorded is contained as precisely as possible, but surrounding anatomical areas are hidden. However, this embodiment may not only be provided with regard to target organs to be recorded, as collimation may also be provided and useful with portions of the body having a smaller diameter (e.g., when recording arms or legs or even the head). In this way, it is possible to provide that the minimum possible dose is applied.

After their determination, the partial recording areas may be displayed to a user (e.g., in a visualization of the model instance) for confirmation. This may be provided if user verification is desired or even necessary. The model instance may then be used to provide as accurate an inside view of the actual patient as possible (e.g., as far as the internal organs contained are concerned), so that with appropriate overlay of the partial recording areas (e.g., together with the target area), it may easily be checked by a user whether the resulting recording will meet their requirements. Confirmation may be provided via a corresponding operating element; in one embodiment, a user interface may be created in which (e.g., by direct interaction with the partial recording areas shown) these may still be adapted.

In one embodiment, a partial image data set for each of the partial recording areas may be reconstructed from the respective projection image set, and the partial image data sets are combined to form the image data set. If the partial image data sets are merged to form the image data set after the reconstruction, robust and three-dimensional information already summarized is available in order to achieve the most accurate merging possible. However, in principle, the projection image sets may be merged for the direct reconstruction of the image data set.

In this context, a predefined and/or determinable overlap may be specified between adjacent partial recording areas. Image data redundantly contained in the partial image data sets is used to merge the partial image data sets into the image data set, or image data redundantly contained in the projection images being used may merge projection images. For example, when using an optimization process to determine the partial recording areas, the provision of the overlap as a constraint may be introduced. Such an overlap may be used to allow a registration (e.g., in addition to already existing spatial relationships from the X-ray coordinate system) that provides a highly accurate merging of the partial recordings, so that a particularly high-quality image data set is obtained. The overlap is selected in such a way as to be sufficient for robust registration. The registration may be carried out, for example, based on geometric and/or anatomical features of the patient in the overlap area. Geometric features of the patient may include, for example, a contour and/or a contrast. Anatomical features of the patient may include, for example, a tissue boundary. For example, geometric and/or anatomical features of the patient displayed in both partial image data sets (e.g., the overlap) may be used for registration. Other registration approaches (e.g., based on artificial intelligence) may also be used.

In this case, the overlap may be firmly specified, but it is also conceivable (e.g., when using a collimation) for the overlap to be selected as a function of the degree of collimation. Thus, for example, if a high degree of collimation is selected (e.g., there is a narrow partial recording area perpendicular to the axis of rotation), a sufficient amount of redundant image data may still be provided by increasing the overlap.

As already indicated, an embodiment results if a biplane X-ray facility with two recording arrangements is used and two of the at least two partial recording areas are recorded simultaneously by simultaneous rotation of the recording arrangements. If, for example, two interconnected C-arms on which the recording arrangements are mounted are used in the biplane X-ray facility, the two interconnected C-arms may be placed at an angle of approximately or exactly 90° to one another, for example, and rotated around the patient at the same time. The X-ray facility is configured such that the X-ray source and the X-ray detector of at least one of the recording arrangements are translationally displaceable along the axis of rotation so that, for example, starting from a basic position in which the isocenters of the recording arrangements coincide, the isocenter of one of the recording arrangements may be displaced relative to the isocenter of the other recording arrangement such that the desired, simultaneously recordable partial recording areas are obtained. Overall, if a control facility of the X-ray facility is configured to carry out the method according to the present embodiments, a biplane X-ray facility that allows simultaneous CBCT recording of both recording arrangements with shifted, optimally selected partial recording areas may be provided such that a high-quality image data set of a long object is produced and at the same time the workflow is simplified and accelerated.

In addition to the method, the present embodiments also relate to an X-ray facility (e.g., a biplane X-ray facility as just described) having a control facility configured to carry out the method according to the present embodiments. All embodiments relating to the method according to the present embodiments may be transferred analogously to the X-ray facility according to the present embodiments, with which the advantages already mentioned may therefore also be obtained.

The X-ray facility is, for example, a C-arm X-ray facility having at least one C-arm, on which an X-ray source and an X-ray detector are arranged opposite one another, each of which forms a recording arrangement. In the case of a biplane X-ray facility, two such C-arms with respective recording arrangements may be provided, which may be used, for example, simultaneously. At least one of the recording arrangements is translationally displaceable along the translation axis in order to set a second partial recording area with an isocenter displaced with respect to the other recording arrangement. Collimation facilities may be assigned to the respective X-ray sources in order to be able to implement determined collimation parameters.

The control facility may include at least one processor and at least one storage device. Functional units may be implemented by hardware (e.g., one or more processors) and/or software components (e.g., program means executed on the processor) in order to carry out acts of the method according to the present embodiments. For example, the control facility may include a first determination unit for determination of a patient-specific, three-dimensional model instance of a parameterizable patient model. The model instance describes the surface and at least one internal organ of the patient. The control facility may include a second determination unit for determination of target area information describing the target area in the model instance from default information provided. The control facility may include a third determination unit for determination of at least two at least partially different partial recording areas of the target area from the target area information. The partial recording areas cover the target area along the axis of rotation. The control facility may include a recording unit for recording a projection image set for each of the partial recording areas, and a reconstruction unit for reconstructing the image data set from the projection image sets.

The recording unit may also be configured to control other recording processes during the recording operation of the X-ray facility. Further functional units may also be provided for the implementation of embodiments of the method according to the present embodiments.

The default information, user inputs, and the like may be provided via corresponding interfaces.

A computer program according to the present embodiments may be directly loaded into a storage device of a control facility of an X-ray facility and has program means to carry out the acts of a method according to the present embodiments when the computer program is executed in the control facility of the X-ray facility. The computer program may be stored on an electronically readable data carrier (e.g., a non-transitory computer-readable storage medium) according to the present embodiments, which thus includes control information stored thereon. The electronically readable data carrier includes at least one computer program according to the present embodiments and is configured such that when the data carrier is used in a control facility of an X-ray facility, the data carrier is configured to carry out a method according to the present embodiments.

BRIEF DESCRIPTION OF THE DRAWINGS

Further advantages and details of the present invention will emerge from the embodiments described hereinafter as well as with reference to the diagrams. The diagrams show.

DETAILED DESCRIPTION

Figure 1:
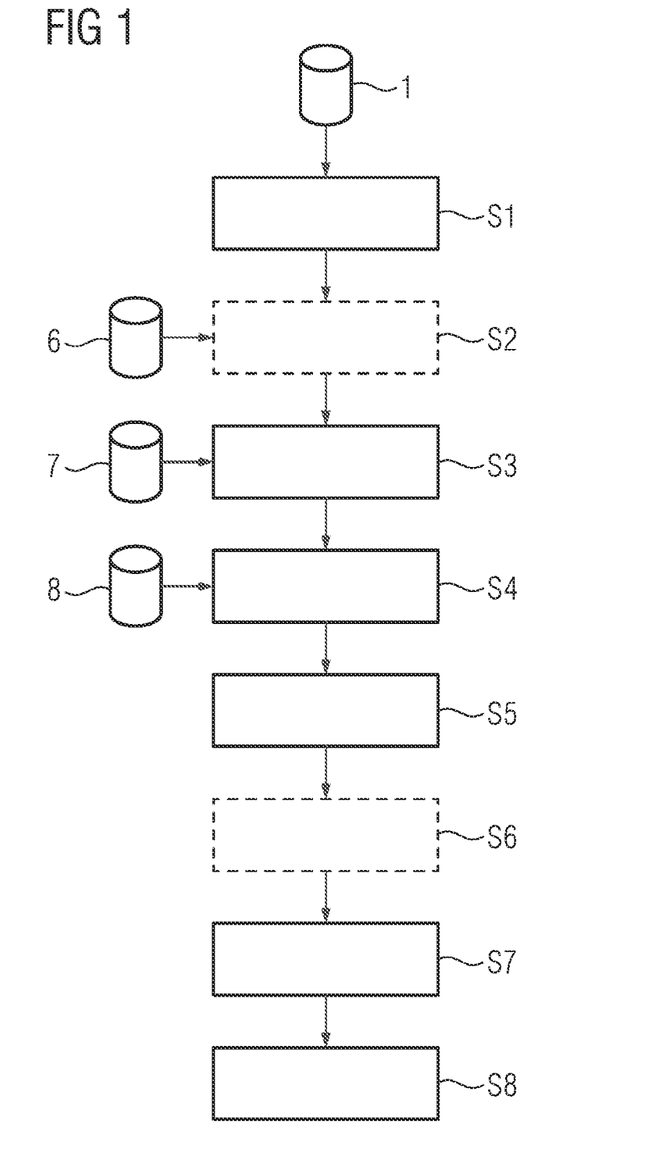
FIG. 1 is a flow chart of an embodiment of a method.

FIG. 1 shows a flow chart of an example of an embodiment of a method. In the method, using an X-ray facility (e.g., a biplane X-ray facility with recording arrangements arranged on the respective C-arms), a target area of a patient is to be recorded during a medical procedure, which, however, is longer than a detection range of each of the recording arrangements along an axis of rotation around which the recording arrangements are rotated around the patient. For example, the target area may be the liver, or the target area may be a navigation area for a medical instrument that is intended to contain the aortic arch and the brain or the skull of the patient. The latter embodiment is appropriate, for example, in medical interventions (e.g., minimally invasive interventions), in which, for example, a catheter is introduced through the groin as a medical instrument. Image information may be required for navigation from the aortic arch onward if the target is located in the head of the patient.

In act S1, a parameterizable patient model is adapted to the current patient, so that a model instance that is patient-specific is produced. Patient data 1 of the patient, which in this case includes the height, weight, and gender of the patient, but may also include the age or even other parameters, is used as a set of parameters for generating the model instance from the patient model. The patient model is a statistical patient model that was determined from patient information from a number of people (e.g., a population of people). The patient information in this case describes not only the corresponding parameters, but also at least a surface of the person and a location of at least one (e.g., a number of) organs to be mapped in the patient model. Organs may include, for example, the bones of the patient, the blood vessels of the patient such as, for example, the aorta, and other organs such as the heart, liver, stomach, intestine, and the like. For example, this information may be included in the patient information by annotated computed tomography full-body scans of the people. The patient model may also be mapped by a trained artificial intelligence function.

Figure 2:
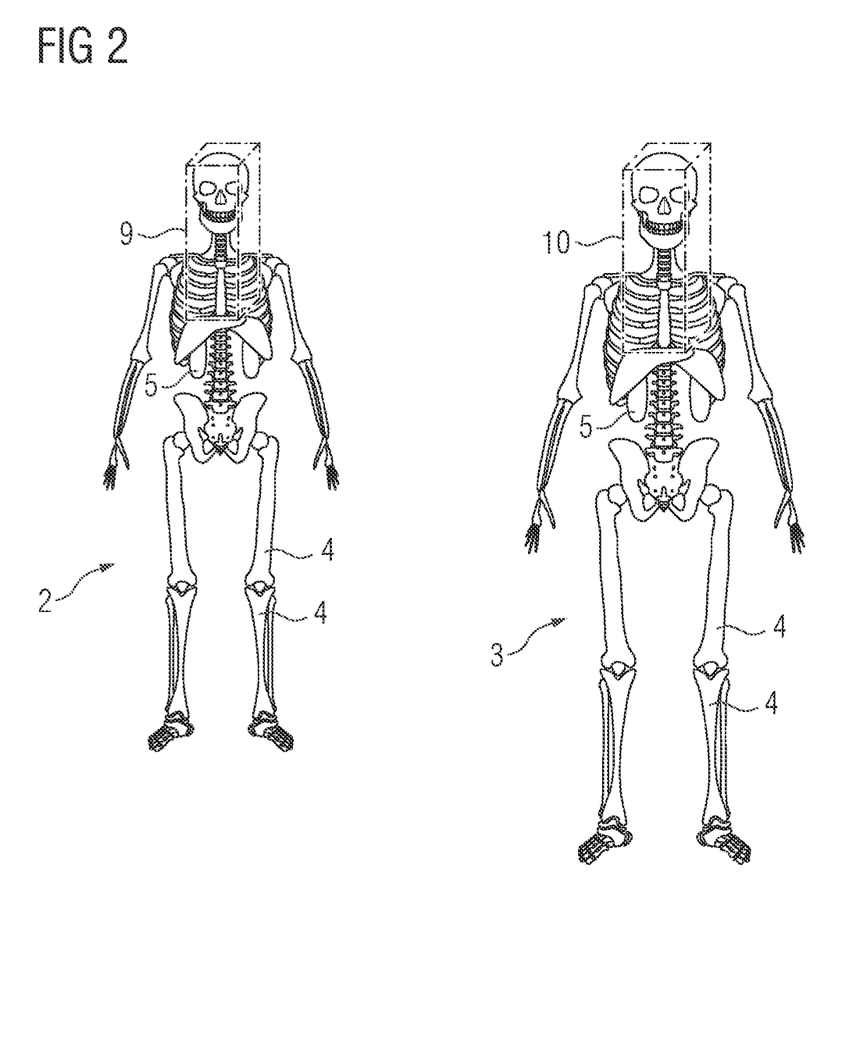
FIG. 2 is a diagrammatic view of two model instances of a patient model with an indicated target area.
Figure 3:
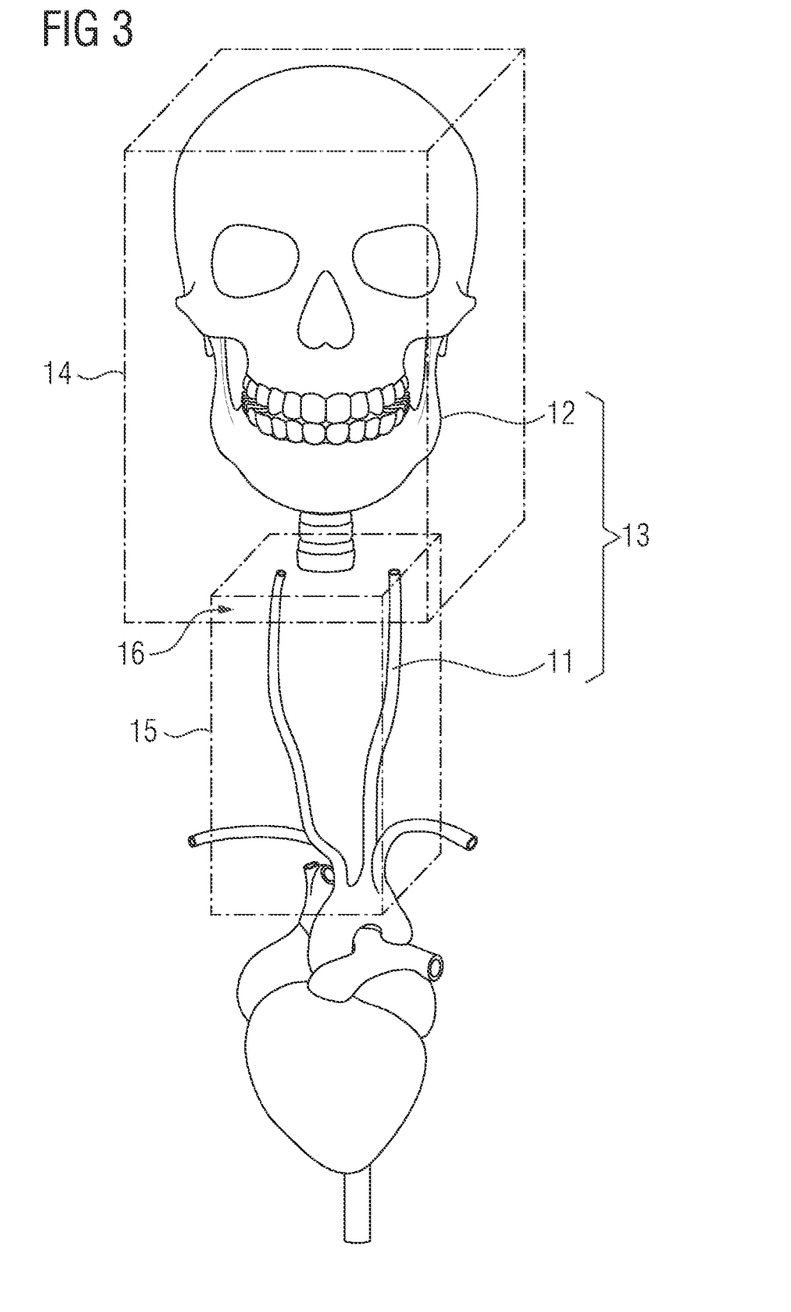
FIG. 3 is a diagrammatic view of organs and determined partial recording areas.

In addition to the further acts S2 to S8 shown in FIG. 1, reference is also made to FIGS. 2 and 3 for explanation.

FIG. 2 shows, by way of example, two model instances 2, 3. The first model instance 2 is generated for a patient with a height of 150 cm and a weight of 70 kg, and the second model instance 3 is generated for a patient with a height of 170 cm and a weight of 120 kg. For the sake of clarity, the outer demarcation of the patient is not shown in order to be able to detect the bones 4 and other organs 5 more precisely. Significant differences may already be seen in the diagrammatic view. The model instance for a current patient may be understood as a digital twin of the patient.

In an optional act S2, additional information 6 may be used to enable the adaptation of the respective model instance 2, 3 even more precisely to the current patient. Additional information 6 may include, for example, image information (e.g., X-ray images of the patient already recorded with the X-ray facility or pre-image data sets recorded at earlier times with the same or other image recording facilities). The additional information 6 may also include sensor information if the patient is at least partially recorded by a sensor system (e.g., a radar sensor or a terahertz camera for detecting their positioning). Additional information 6 may also describe implants and/or apparatuses inside the body of the patient that may be added to the model instance 2, 3. Consequently, additional information 6 leads to at least local adaptation of the model instance 2, 3.

In the present embodiment of the method, a digital twin of the X-ray facility is also used (e.g., an X-ray facility model). In the X-ray facility model, a coordinate system of the X-ray facility is used. In addition to the recording arrangements, the X-ray facility model also describes the patient couch of the X-ray facility, which has a patient couch on which the patient is placed for the medical procedure. In order to relate the model instance 2, 3 to the X-ray facility model and thus to the coordinate system of the X-ray facility, positioning information 7 describing the positioning of the patient in the X-ray facility is evaluated in act S3. The positioning information 7 may originate, for example, from sensor information already mentioned (e.g., a radar sensor and/or a terahertz camera), but may also be derived from user input. The positioning information may describe at least one orientation of the patient (e.g., on the abdomen/on the back and feet first/head first) and a position indication for positioning of the patient on a patient couch. The setting of the patient couch is already known in the control facility of the X-ray facility.

In act S4, target area information is determined from default information 8 that describes the target area in the model instance 2, 3 and based on the previous step S3, also in the coordinate system of the X-ray facility. The default information 8 may be determined, for example, based on user input (e.g., interactively in a representation of the model instance 2, 3). In this case, for example, a cuboid that is intended to display the target area may be marked by an operator.

Examples of such target areas 9, 10 are indicated in FIG. 2. Both of these target areas 9, 10 may include the aortic arch and the head of the patient. In the case of a larger, more corpulent patient model instance 3, a larger target area 10 is clearly produced.

However, the default information 8, and accordingly then also the target area information, may describe organs to be recorded, which are mapped in the model instance 2, 3. In the example mentioned here, these may be the aortic arch and the brain/the head.

FIG. 3 shows, by way of example, both the aortic arch 11 and the head 12, indicated as a skull, as target organs 13 to be recorded. Also in the case of organs 13 to be recorded, a user input may form the basis, but also another item of default information 8 that is already present, for example, in the control facility or may be accessed by the control facility. If it is known, for example, which medical procedure is to be performed, it can be inferred from this as target area information which organs 13 are to be recorded. If, for example, information is available that navigation is to take place through the aortic arch 11 to the head 12, the aortic arch 11 and the head 12 may be identified therefrom as organs 13 to be recorded. This may also be inferred from the fact that the medical procedure is a minimally invasive intervention, starting from the groin, in the head. In other cases, default information 8 may also be a used image recording protocol. For example, if a "liver organ program" has been selected, the liver may be identified as the organ 13 to be recorded. In summary, the target area information may therefore include organ information that describes at least one organ 13 to be recorded.

In act S5, at least partially different partial recording areas are then determined in an optimization process (e.g., two partial recording areas). The patient dose is minimized. Constraints that the target area 9, 10 or area described by the organs 13 to be recorded may be completely covered, and that there should be a specified overlap between the partial recording areas are used in order to enable robust registration subsequently. In this case, not only the location of the isocenters is optimized, but also the collimation to be used, described by at least one collimation parameter. By way of example, FIG. 3 diagrammatically indicates two such partial recording areas 14, 15 that may be cylindrical in reality. The partial recording area 14 has a larger extension perpendicular to the axis of rotation and completely encompasses the head 12. On account of the narrower aortic arch 11, the partial recording area 15 may be selected to be less extensive, which also reduces the dose of radiation for the patient. The defined overlap 16 specified is, for example, also clearly visible. Embodiments in which the overlap 16 is not firmly specified but varies depending on the desired collimation may also be provided.

In an optional act S6, a user may be shown a preview image (e.g., based on the model instance 2, 3). The determined partial recording areas 14, 15 are also shown in this preview image. The user may now confirm this or, however, using, for example, interaction with the preview image, adjust according to their wishes if necessary.

In act S7, the recording of projection image sets for both partial recording areas 14, 15 then takes place also using the determined at least one collimation parameter. In the present case, as the location of the partial recording areas 14, 15 in the coordinate system of the X-ray facility is also known, the recording arrangements and/or the patient couch are automatically positioned, such that corresponding isocenters of the partial recording areas 14, 15 are produced. After this, with simultaneous rotation of both recording arrangements, the projection images for both partial recording areas 14, 15 may be recorded simultaneously so that movement effects may be minimized.

In act S8, a common image data set containing the entire target area 9, 10 (or defined by the organs 13 to be recorded) is reconstructed from the projection image sets. In the present embodiment, partial image data sets are first reconstructed from each of the projection image sets (e.g., by filtered back projection). Due to the relative position of the partial image data sets to one another known in the coordinate system of the X-ray facility and in addition to the refinement due to registration in the overlap 16, the partial image data sets may be merged to form a common image data set.

Figure 4:
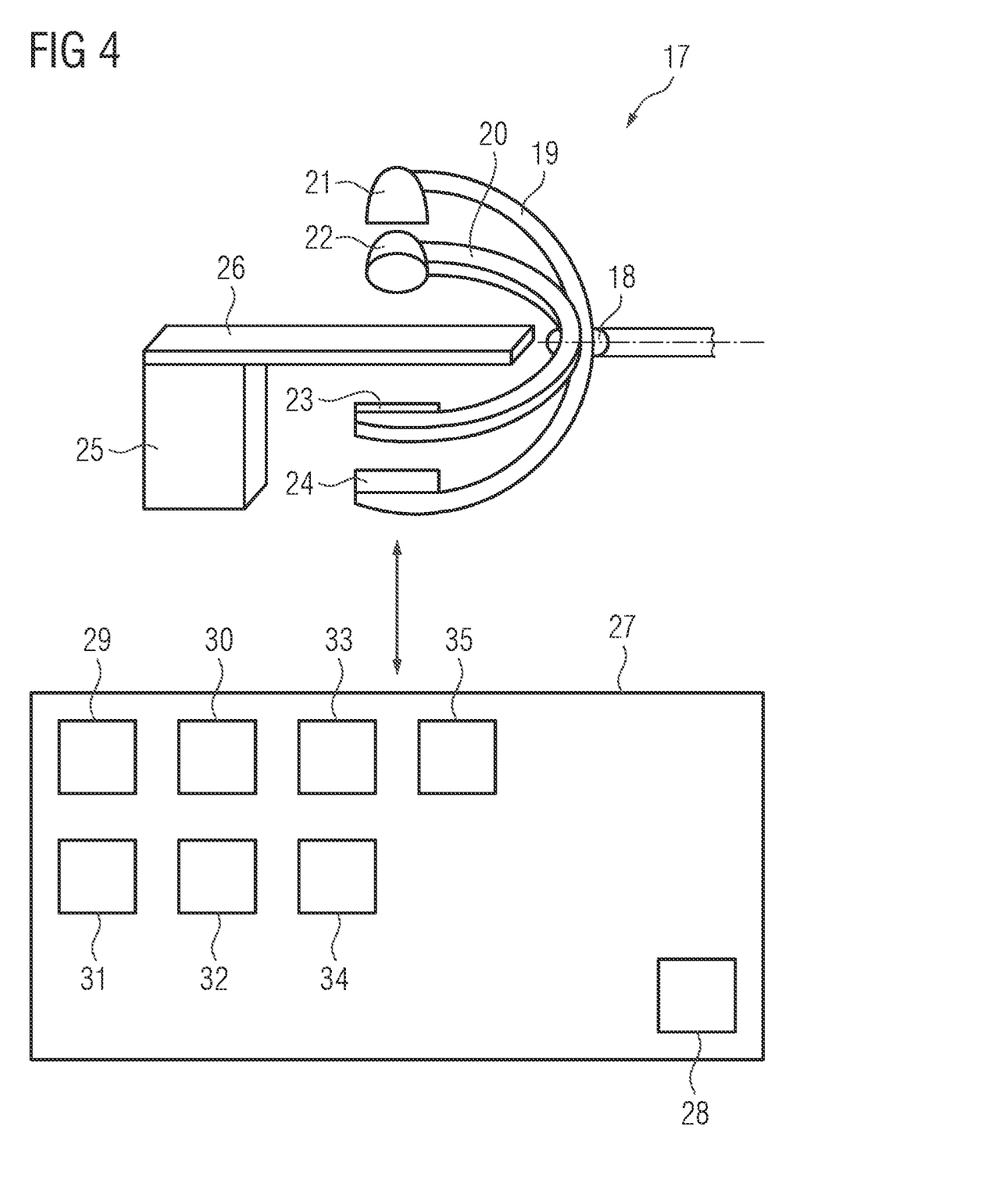
FIG. 4 is an X-ray facility according to an embodiment.

FIG. 4 shows a schematic diagram of an X-ray facility 17 according to an embodiment. The X-ray facility 17 has two C-arms 19, 20 held on a stand 18. An X-ray source 21, 22 and an X-ray detector 23, 24 are arranged opposite each other on each of the C-arms 19, 20 in order to form two recording arrangements.

The biplane X-ray facility 17 further includes a patient couch 25 with an adjustable patient couch 26, as is known in principle. The operation of the X-ray facility 17 is controlled via a control facility 27, shown here in an oversized diagrammatic view with its functional components, which is also configured to carry out the method according to the present embodiments.

For this purpose, in addition to a storage device 28, the control facility 27 first has a first determination unit 29 for performing the acts S1 and optionally S2. In this case, recourse may be had to the patient model stored, for example, in the storage device 28. The patient data 1 and, where applicable, the additional information 6 may be obtained via a corresponding interface not shown in more detail here.

In a positioning unit 30, according to act S3, the spatial assignment of the model instance 2, 3 as a digital twin of the patient to the X-ray facility model as a digital twin of the X-ray facility 17 is performed. It is possible to receive the positioning information 7 via a corresponding interface not shown in more detail.

In a second determination unit 31, the default information 8, likewise obtained via an interface not shown in more detail, is used according to act S4 in order to determine the target area information. This is used in a third determination unit 32 to determine the partial recording areas according to act S5.

If the optional act S6 is provided, a user interaction unit 33 may be used accordingly to perform act S6.

A recording unit 34 that may also be used for controlling other recording procedures controls the recording of the projection image sets according to act S7. The described isocentering by controlling the recording arrangements/C-arms 19, 20 and/or the patient couch 25 may also be carried out by the recording unit 34, unless an additional, possibly subordinate function unit is provided here.

In the reconstruction unit 35, as described in act S8, the reconstruction and thus determination of the image data set from the projection image sets may finally take place.

Although the invention was illustrated and described in more detail by the embodiments, the invention is not limited by the examples disclosed, and other variations may be derived therefrom by a person skilled in the art without departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating an X-ray facility for recording a three-dimensional (3D) image data set of a target area of a patient, wherein a recording arrangement of the X-ray facility, comprising an X-ray detector and an X-ray source, is rotatable about an axis of rotation for recording two-dimensional (2D) projection images based on the 3D image data set, and the target area is larger along the axis of rotation than the detection area of the recording arrangement, the method being computer-implemented and comprising:
   determining a 3D model instance of a parameterizable patient model that is patient-specific, wherein the 3D model instance describes a surface and at least one internal organ of the patient;
   determining target area information describing the target area in the 3D model instance from default information provided;
   determining at least two at least partially different partial recording areas of the target area from the target area information, wherein the at least two at least partially different partial recording areas cover the target area along the axis of rotation; and
   recording one projection image set respectively for each of the at least two at least partially different partial recording areas and reconstructing the 3D image data set from the projection image sets.

2. The method of claim 1, wherein:
   the parameterizable patient model is statistically determined from a multiplicity of patient information of different people, which comprises at least the surface, the at least one organ, and parameters necessary for generating a model instance;
   patient data of the patient is used as parameters for generating the model instance; or
   a combination thereof.

3. The method of claim 2, wherein the patient data of the patient is used as the parameters for generating the model instance, and wherein the patient data of the patient includes an age, a gender, a height, a weight, or any combination thereof.

4. The method of claim 1, wherein determining the 3D model instance comprises adapting the 3D model instance to the patient based on at least one item of additional information.

5. The method of claim 4, wherein the at least one item of additional information includes image information, sensor information, or a combination thereof about the patient.

6. The method of claim 1, further comprising positioning the 3D model instance in a coordinate system of the X-ray facility, the positioning of the 3D model instance comprising receiving and evaluating at least one item of positioning information describing positioning of the patient in the X-ray facility.

7. The method of claim 6, wherein:
the item of positioning information comprises an orientation of the patient, a position indication for a positioning of the patient on a patient couch of the X-ray facility, a setting of the patient couch, or a combination thereof;
wherein the item of positioning information is determined from sensor data of a sensor directed at the patient, from a user input, or from the sensor data and from the user input; or
a combination thereof.

8. The method of claim 1, wherein the target area information is determined as default information from a user input, from application information describing the imaging target, or from a combination thereof.

9. The method of claim 8, wherein the target area information is determined as default information from an image recording protocol to be used.

10. The method of claim 1, wherein the target area information comprises at least one item of organ information describing an organ to be recorded of the at least one organ, which is evaluated together with the position of the at least one organ in the model instance during the determining of the at least two at least partially different partial recording areas.

11. The method of claim 1, wherein the at least two at least partially different partial recording areas are determined in an optimization process for minimizing a number of partial recording areas, for minimizing a patient dose, or for a combination thereof.

12. The method of claim 1, wherein for each of the at least two at least partially different partial recording areas, a collimation parameter describing a collimation to be used is determined and used for the respective recording of the projection image set.

13. The method of claim 1, wherein a partial image data set for each of the at least two at least partially different partial recording areas is reconstructed from the respective projection image set, and the partial image data sets are combined, such that the 3D image data set is formed, or
wherein the projection image sets are merged for the direct reconstruction of the image data set.

14. The method of claim 13, wherein a predefined, determinable, or predefined and determinable overlap is specified between adjacent partial recording areas of the at least two at least partially different partial recording areas, and
wherein image data redundantly contained in the at least two at least partially different partial image data sets is used to merge the at least two at least partially different partial image data sets into the 3D image data set, or image data redundantly contained in the 2D projection images is used to merge the 2D projection images.

15. The method of claim 1, wherein the X-ray facility is a biplane X-ray facility with two recording arrangements, and
wherein two of the at least two at least partially different partial recording areas are simultaneously recorded by simultaneous rotation of the two recording arrangements.

16. An X-ray facility comprising:
a controller configured to operate an X-ray facility for recording a three-dimensional (3D) image data set of a target area of a patient, wherein a recording arrangement of the X-ray facility, comprising an X-ray detector and an X-ray source, is rotatable about an axis of rotation for recording two-dimensional (2D) projection images based on the 3D image data set, and the target area is larger along the axis of rotation than the detection area of the recording arrangement, the controller being configured to operate the X-ray facility for recording the 3D image data set of the target area of the patient comprises the controller being configured to:
determine a 3D model instance of a parameterizable patient model that is patient-specific, wherein the 3D model instance describes a surface and at least one internal organ of the patient;
determine target area information describing the target area in the 3D model instance from default information provided;
determine at least two at least partially different partial recording areas of the target area from the target area information, wherein the at least two at least partially different partial recording areas cover the target area along the axis of rotation; and
record one projection image set respectively for each of the at least two at least partially different partial recording areas and reconstruct the 3D image data set from the projection image sets.

17. In a non-transitory computer-readable storage medium that stores instructions executable by one or more processors to operate an X-ray facility for recording a three-dimensional (3D) image data set of a target area of a patient, wherein a recording arrangement of the X-ray facility, comprising an X-ray detector and an X-ray source, is rotatable about an axis of rotation for recording two-dimensional (2D) projection images based on the 3D image data set, and the target area is larger along the axis of rotation than the detection area of the recording arrangement, the instructions comprising:
determining a 3D model instance of a parameterizable patient model that is patient-specific, wherein the 3D model instance describes a surface and at least one internal organ of the patient;
determining target area information describing the target area in the 3D model instance from default information provided;
determining at least two at least partially different partial recording areas of the target area from the target area information, wherein the at least two at least partially different partial recording areas cover the target area along the axis of rotation; and
recording one projection image set respectively for each of the at least two at least partially different partial recording areas and reconstructing the 3D image data set from the projection image sets.

* * * * *